Jan. 13, 1959     H. W. PETERS     2,868,178
AUTOMATICALLY REGULATED LIQUID HEATER
Filed July 27, 1955
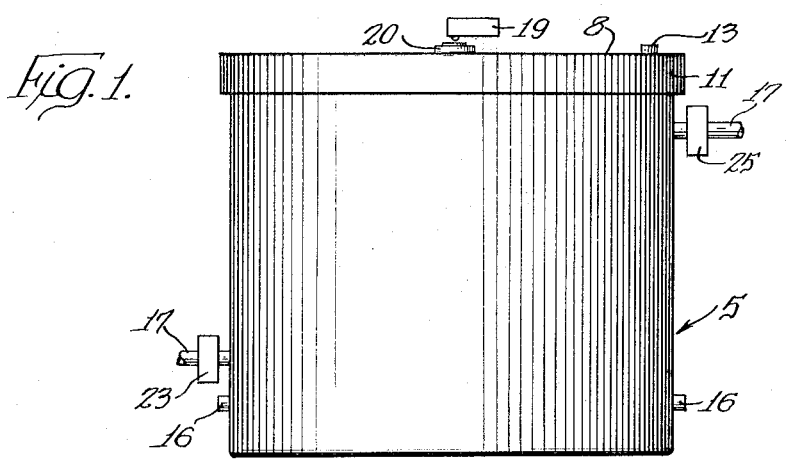
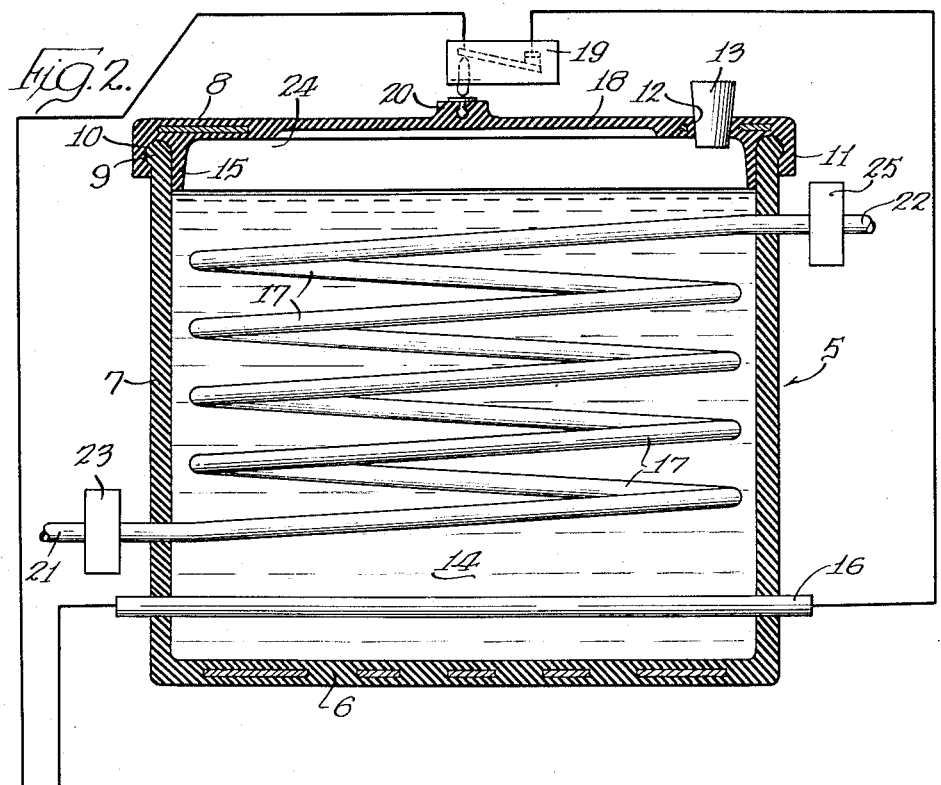
INVENTOR.
Herbert W. Peters
BY Schroeder, Hofgren,
Brady & Wegner
Attys.

United States Patent Office 2,868,178
Patented Jan. 13, 1959

2,868,178

AUTOMATICALLY REGULATED LIQUID HEATER

Herbert W. Peters, Milwaukee, Wis., assignor to Cory Corporation, a corporation of Delaware Application July 27, 1955, Serial No. 524,729

10 Claims. (Cl. 122—32)

This invention relates to a liquid heater and in particular to a liquid heater of the type employing a liquid fill as a heat exchange medium.

In the preparation or production of certain liquid substances, such as coffee infusions, it is desirable to heat the liquid to a temperature somewhat less than the boiling temperature of the liquid at the ambient pressure. It has been found that the extraction of the desirable oils from the ground coffee charge is directly related to the temperature of the liquid and inversely related to the ambient pressure. Where coffee brewing apparatus is subjected to substantial variations in the ambient pressure, such as may occur in aircraft or railroad use, means must be provided to compensate for such variations or unsatisfactory infusions may result.

While means are known in the art for regulating adjustably the temperature to which a liquid is heated, these means, such as thermostat devices, pressure switches, and similar manually operable devices, require adjustment or setting thereof with variations in the ambinet pressures, thus introducing the possibility of human error. Further in the devices embodying a heat exchanging fill, such as is contemplated in my device, the devices known in the art are incapable of regulating sufficiently accurately the temperature of the heated liquid due to inherent heat lags therein. As the optimum temperature for production of satisfactory coffee is relatively critical (as undesirable tannins are produced in substantial quantities at temperatures higher than the optimum temperature) such devices found in the art often produce unsatisfactory coffee.

It is the principal object of this invention to provide a new and improved automatically regulated means for heating a liquid.

Another object of the invention is to provide new and improved means for heating a liquid to a temperature relatively less than the boiling temperature at any given ambient pressure.

A further object is to provide a new and improved liquid heating device, utilizing a heat exchanging fill, with minimum residual heating capacity adapted to maintain accurately the temperature to which the liquid is heated.

Still another object of the invention is to provide a new and improved liquid heating device, having a heat exchanging fill in a sealed compartment, and arranged to discontinue the heating of the fill whenever the vapor pressure in the compartment is equal to the ambient pressure.

A still further object of the invention is to provide an automatic liquid heater of the heat exchanger type arranged to provide automatically a substantially constant outlet temperature regardless of the inlet temperature over a normally expected range.

Other features and advantages of this invention will be apparent from the following description taken in connection with the accompanying drawings wherein:

Figure 1 is an elevational view of a liquid heating device embodying the invention; and Figure 2 is a vertical sectional view of the device of Figure 1.

In the illustrative embodiment of the invention as shown in the drawings, my liquid heating device is seen to comprise a hermetically sealed container 5 having heating means 16 in the lower portion thereof and with a conduit or coil 17 disposed therein above the heating means, through which coil the liquid to be heated is passed. To control the flow from coil 17, a valve 25 is provided at its outlet 22. A fill 14 comprising a liquid preferably similar to the liquid being heated in coil 17 is provided in container 5 and surrounding heating means 16 and coil 17, but incompletely filling the space in container 5 above coil 17, thereby forming a vapor space 24 at the upper portion of the container.

Container 5 is constructed in a novel manner so as to have cooperative action with a control 19 to discontinue substantially instantaneously the elevation of the temperature of fill 14 whenever the temperature thereof reaches the boiling point of the liquid thereof at the circumambient pressure. Further, the residual heat capacity of heating means 16 is made minimal thereby allowing the action of control 19 immediately to effect the system, thereby maintaining an accurate control over the temperature of the liquid being heated in coil 17 notwithstanding the use of the intermediate heat exchanging fill 14.

Container 5 comprises, in the exemplary embodiment of the drawings, a generally cup-shaped element having a transversely extending bottom 6 with upstanding side walls 7. A closure member 8 is sealingly secured across the upper edges of side wall 7 by suitable means such as bead 9, formed at the upper end of the side walls, which is adapted to be received within a complementary groove 10 in a peripheral depending flange 11 on the closure member. This container is preferably formed of a resilient material such as rubber to facilitate the gripping of bead 9 by the closure 8. To permit introduction of the fill liquid 14 into the container 5, closure 8 may be provided with an opening 12 having a suitable removable stopper 13. The means incorporated in container 5 for actuating control 19 to regulate heating element 16 is shown to comprise a flexible portion 18 of closure member 8 bounding a portion of vapor space 24. Preferably centrally carried by portion 18 is an actuating boss 20 adapted to operate control 19 whenever portion 18 is not flexed inwardly by a pressure in space 24 less than the ambient pressure on the exterior of container 5. Such a structure allows the use of a sealed fill 14 permitting the substantial elimination of maintenance attendant such use while providing automatic limitation of the temperature of the fill to the boiling temperature of the liquid utilized at the particular ambient pressure in which the device is used.

To allow the substantially instantaneous prevention of temperature elevation over the desirable boiling temperature of fill 14, heating means 16 is arranged to have minimal residual heat, a preferable embodiment of such means being an electrical heating element such as a Calrod. When such an electrical heating element is used, control means 19 may constitute simply an electrical switch or relay. As the entire container 5 constitutes a pressure retaining member, control 19 may be actuated by a positive pressure in space 24 caused by a pressure increase anywhere within the container including immediately adjacent heating element 16. Thus, when the temperature of fill 14 immediately surrounding heating means 16 reaches the boiling temperature thereof, the formation of the gaseous phase of the liquid in this portion of the container, acts to raise the pressure in the space 24 and operate control 19. Further, upon condensation of the fill vapor in space 24, the heat of vaporization is returned to the fill thereby maintaining the fill at a substantially constant temperature even though the pressure of the vapor varies to cause an "off" and "on" operation of heating means 16. Only the vapor is condensed during the "off" cycle as control 19 is affected immediately as the pressure drops, so that only a minimal amount of heat is necessary to effect revaporization. Thus, it may be seen that the cooperative action of pressure responsive portion 18 and control 19, together with the limitation of the temperature changes in fill 14 to the vapor phase, and the low residual heat of element 16 effect a substantially instantaneous and constant limitation of the temperature of fill 14 to the boiling temperature.

To insure the maintenance of the desired temperature of the liquid to be heated in coil 17 at a temperature somewhat below the boiling temperature of that liquid at ambient pressure, I provide a novel construction wherein coil 17 has a small volume and a substantial length in container 5 and with an inlet 21 adjacent the lower end of the container and outlet 22 adjacent the upper end of the container. In the preferred form, coil 17 may comprise a helically coiled tube of ¼" nominal outside diameter and having a length of about 40 to 50 feet so as to have an internal volume of approximately 10 fluid ounces. A flow regulating device, of any suitable type known in the art, is provided at inlet 21 to maintain the flow of liquid through coil 17 at a constant value at all times. I have found that the normal range of inlet liquid temperatures is from just over freezing, or approximately 34° F., to approximately 100° F., with a liquid such as water. To allow use of a heating means 16 of minimum capacity and residual heat, I provide a means 16 capable of producing sufficient heat only to raise the temperature of the water in coil 17 from 34° F. to the desired outlet temperature. In determining this heat capacity the rate of flow of liquid through the coil 17, the total length of coil 17 in container 5 exposed to fill 14, the thermal conductivity of the material of which the coil 17 is formed, and the specific heat of the liquid to be heated, are considered. I have found further that when a continuous flow is maintained through coil 17, the temperature of the liquid leaving the coil at outlet 22 may be maintained at a single desirable value irrespective of the inlet temperature over the normal expected range. This result is due in part to the fact that the transfer of heat from the coil 17 to the liquid therein is directly proportional to the difference in temperature therebetween and, as the temperature difference is less adjacent the outlet than it is adjacent the inlet due to the continuous heating thereof during movement of the liquid through the coil, a non-linear function is established between the temperature of a given portion of the liquid in the coil and the amount of time it is in the coil. Thus, as relatively cold inlet liquid is heated relatively to a greater extent originally than relatively warm inlet liquid, by making coil 17 sufficiently long and thus retaining a given portion of the moving liquid volume therein a sufficient period of time substantially identical outlet temperatures may be obtained. If the liquid in coil 17 is allowed to remain therein sufficiently long, it will approximate the temperature of fill 14 which is substantially the boiling temperature of the liquid at the ambient pressure. However, as indicated above, a temperature of the heated liquid somewhat lower than the boiling temperature of the liquid is desired. To prevent the undesirably high temperature liquid, which results from a discontinuation of the flow thereof through coil 17 when fill 14 is at boiling temperature, from undesirably affecting the temperature of the withdrawn liquid, such superheated liquid may simply be discarded. I have found that in ordinary usage, a quantity of at least one-half gallon of water is withdrawn at one time, and thus the 10 fluid ounces of superheated liquid represents a negligible disposable quantity. Alternatively, as the differential between the desired outlet temperature and the temperature of the superheated liquid is relatively small and the quantity of superheated liquid is minimal, the total excess heat energy therein is small and when a relatively large total quantity of liquid is withdrawn at one time, the mixing of the small quantity of superheated liquid in the larger mass of liquid has a negligible effect on the resultant temperature of the entire mass.

In using my heating device, container 5 is first filled to the desired level with a liquid similar to the liquid to be heated. For purposes of this description, the liquid to be heated may be water to be used in preparing coffee and the fill 14 would thus be water. With stopper 13 removed from opening 12, heating means 16 is energized to heat the water comprising fill 14. When the water reaches the boiling temperature, it is permitted to boil for a short period of time to drive off occluded gases and expel air from space 24 and fill the space with fill vapor. Plug 13 is then pressed into opening 12 to seal hermetically the housing. The heating of fill 14 may then be continued until sufficient vapor pressure is created within space 24 to actuate control 19 through portion 18 and boss 20 thereon. Control switch 19 acts to discontinue immediately the energization of heating means 16 thereby preventing the raising of the temperature of fill 14 above the boiling temperature. Thereupon, some cooling of the fill 14 takes place, the vapor in space 24 condenses substantially instantaneously, the pressure is eliminated, and switch 19 is allowed to cause energization again of heating means 16. As a consequence of this, there are repeated short "on" and "off" cycles maintaining the water constituting fill 14 substantially at boiling temperature for the particular ambient pressure surrounding the heating device.

With fill 14 maintained at this desired temperature the opening of valve 25 allows liquid to flow through coil 17 wherein it is raised to the desired outlet temperature. As the fill temperature is accurately maintained as described above, and the rate of flow is maintained constant by regulator 23, the outlet temperature of the liquid from coil 17 is very accurately controlled. Through providing a coil 17 of the specific length permitting reduction of the temperature differential between the liquid in the coil and the temperature of the fill to the desired amount with an incoming water supply at approximately 34° F. with heating means 16 functioning continuously, my device is arranged automatically to heat liquid to substantially the same outlet temperature irrespective of the inlet temperature over the normal range thereof by discontinuously heating fill 14 when higher temperature inlet liquid is introduced. Any superheated liquid discharged initially upon opening valve 25 may be discarded or mixed with the larger mass of liquid withdrawn as desired.

Thus, my liquid heating device is capable of heating liquid to a desired temperature which varies with the ambient pressure, which temperature is somewhat less than the boiling temperature at the ambient pressure, and which is independent of the incoming liquid temperature over the normal expected range. No adjustments by the operator of the device are necessary, so that, for example, coffee produced by such a device is substantially equivalent irrespective of the altitude at which it is brewed.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. Means for heating a fluid to a desired temperature, comprising: a closed container; a fluid fill in the container having a liquid phase and a vapor phase; heating means for delivering heat energy into said fill; means for transferring heat energy from the liquid phase of the fill to the fluid to be heated; and means controlling the heating means to effect delivery of heat energy into the fill to maintain the fill at boiling temperature, including means responsive to variations in the pressure of the vapor phase operative to permit heat delivery to the fill when the vapor phase exerts less than a predetermined pressure at the boiling temperature and preclude heat delivery to the fill when the vapor phase exerts more than a predetermined pressure at the boiling temperature.

2. Means for heating a fluid to a desired temperature, comprising: a closed container; a fluid fill in the container having a liquid phase and a vapor phase; heating means for delivering heat energy into said fill; means for transferring heat energy from the liquid phase of the fill to the fluid to be heated; means controlling the heating means to effect delivery of heat energy into the fill to maintain the fill at boiling temperature, including means responsive to variations in the pressure of the vapor phase operative to permit heat delivery to the fill when the vapor phase exerts less than a predetermined pressure at the boiling temperature and preclude heat delivery to the fill when the vapor phase exerts more than a predetermined pressure at the boiling temperature; and means for correlating the pressure of the vapor phase with the ambient pressure to permit the liquid phase to boil substantially at the boiling temperature thereof at the ambient pressure.

3. The apparatus of claim 2 wherein said means for correlating the pressure of the vapor phase with the ambient pressure comprises means providing free communication between the ambient atmosphere and the portion of the interior of the container in which the vapor phase exists during a pressure correlating period and precluding such communication during heating of the fluid to be heated.

4. Means for heating a fluid to a desired temperature, comprising: a closed container; a fluid fill in the container having a liquid phase and a vapor phase; heating means for delivering heat energy into said fill; means controlling the heating means to effect delivery of heat energy into the fill to maintain the fill at boiling temperature, including means responsive to variations in the pressure of the vapor phase operative to permit heat delivery to the fill when the vapor phase exerts less than a predetermined pressure at the boiling temperature and preclude heat delivery to the fill when the vapor phase exerts more than a predetermined pressure at the boiling temperature; and means for associating the fluid to be heated with the liquid phase of the fill for a period of time suitable to cause the temperature of the fluid to be heated to be a predetermined temperature which is a proper fraction of the boiling temperature.

5. The apparatus of claim 4 wherein the means for associating the fluid to be heated with the liquid phase of the fill comprises a heat transferring conduit extending through the fill, and means for effecting flow of the fluid to be heated through the conduit at an accurately predetermined rate.

6. The heater of claim 5 wherein said conduit is formed of ¼" diameter tubing and has a length of 40 to 50 feet.

7. The heater of claim 5 wherein said conduit in said fill has a capacity of 10 fluid ounces.

8. Means for heating a fluid to a desired temperature, comprising: a closed container; a fluid fill in the container having a liquid phase and a vapor phase; heating means for delivering heat energy into said fill; means for transferring heat energy from the liquid phase of the fill to the fluid to be heated; and means controlling the heating means to effect delivery of heat energy into the fill to maintain the fill at boiling temperature, including means responsive to variations in the pressure of the vapor phase operative to permit heat delivery to the fill when the vapor phase exerts less than a predetermined pressure at the boiling temperature and preclude heat delivery to the fill when the vapor phase exerts more than a predetermined pressure at the boiling temperature, said heating means having low residual heat and being associated with the fill so as to effect a discontinuation of heat energy delivery to the fill substantially instantaneously upon a corresponding operation of the controlling means.

9. Means for heating a fluid to a desired temperature, comprising: a closed container having a displaceable wall defining a top portion thereof; a fluid fill in the container having a liquid phase and a vapor phase, said vapor phase being bounded by said wall; heating means for delivering heat energy into said fill; means for transferring heat energy from the liquid phase of the fill to the fluid to be heated; and means controlling the heating means to effect delivery of heat energy into the fill to maintain the fill at boiling temperature, including means responsive to displacement of said wall resulting from pressure of the vapor phase to permit heat delivery to the fill when the vapor phase exerts less than a predetermined pressure at the boiling temperature and preclude heat delivery to the fill when the vapor phase exerts more than a predetermined pressure at the boiling temperature.

10. Means for heating water to a desired temperature, comprising: a closed container having a displaceable wall defining a top portion thereof; a fluid fill in the container having a liquid phase and a vapor phase, said vapor phase being bounded by said wall; heating means for delivering heat energy into said fill; means controlling the heating means to effect delivery of heat energy into the fill to maintain the fill at the boiling temperature, including means responsive to displacement of said wall resulting from pressure of the vapor phase operative to permit heat delivery to the fill when the vapor phase exerts less than a predetermined pressure at the boiling temperature and preclude heat delivery to the fill when the vapor phase exerts at least said predetermined pressure at the boiling temperature, said heating means having low residual heat and being associated with the fill so as to effect a discontinuation of heat energy delivery to the fill substantially instantaneously upon a corresponding operation of the controlling means; means for correlating the pressure of the vapor phase with the ambient pressure to permit the liquid phase to boil substantially at the boiling temperature thereof at the ambient pressure; and means for associating the water to be heated with the liquid phase of the fill for a period of time suitable to cause the temperature of the water to be heated to be a predetermined temperature which is a proper fraction of the boiling temperature.

References Cited in the file of this patent

UNITED STATES PATENTS

| 1,389,628 | Clark | Sept. 6, 1921 |
| 1,607,393 | Derby | Nov. 16, 1926 |
| 2,402,899 | Knapp | June 25, 1946 |

FOREIGN PATENTS

| 685,501 | Great Britain | Jan. 7, 1953 |